Nov. 6, 1934.     J. EDGAR     1,979,536
TRUING DEVICE FOR GRINDING WHEELS
Filed Feb. 28, 1929     7 Sheets-Sheet 5

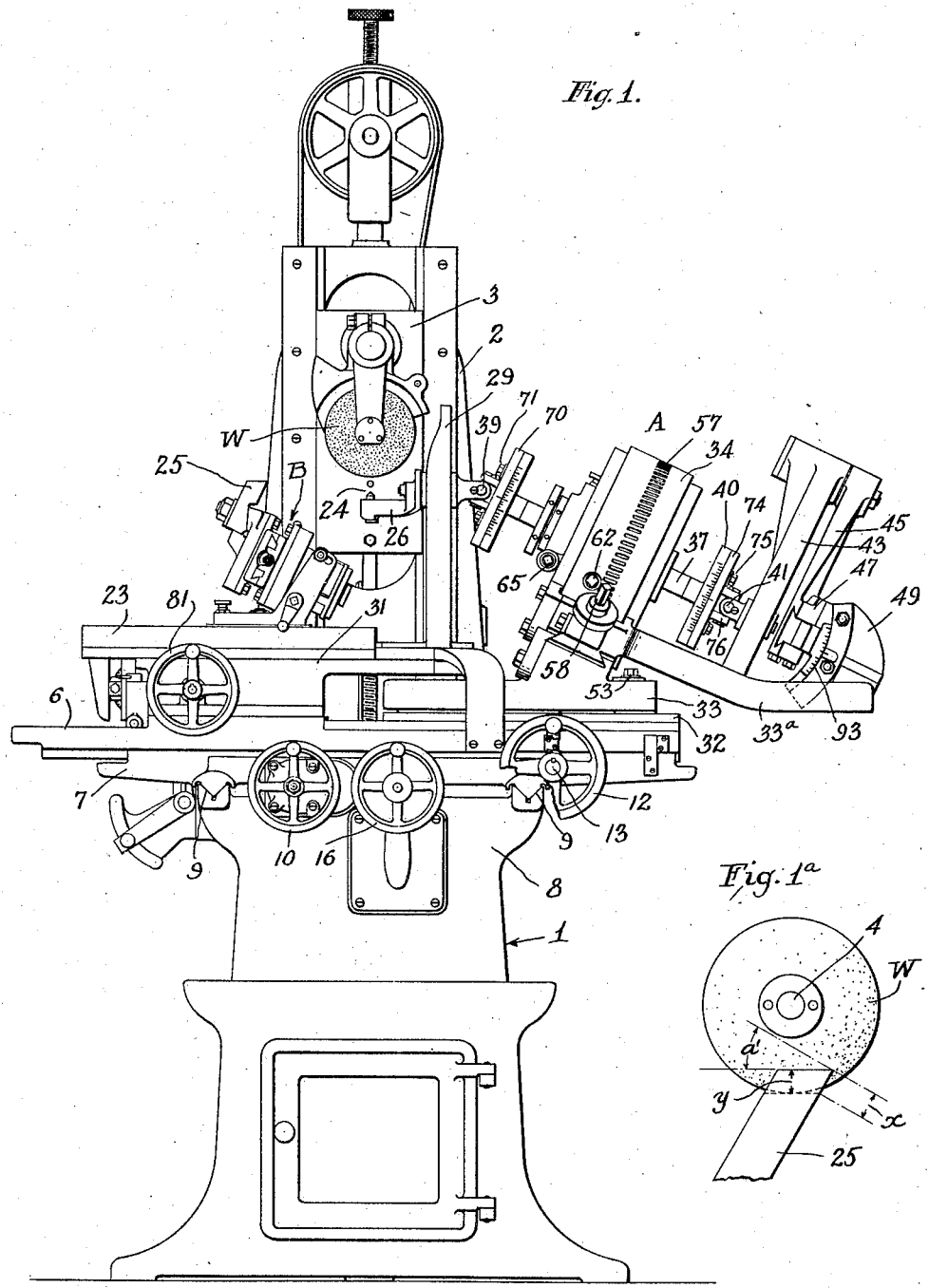

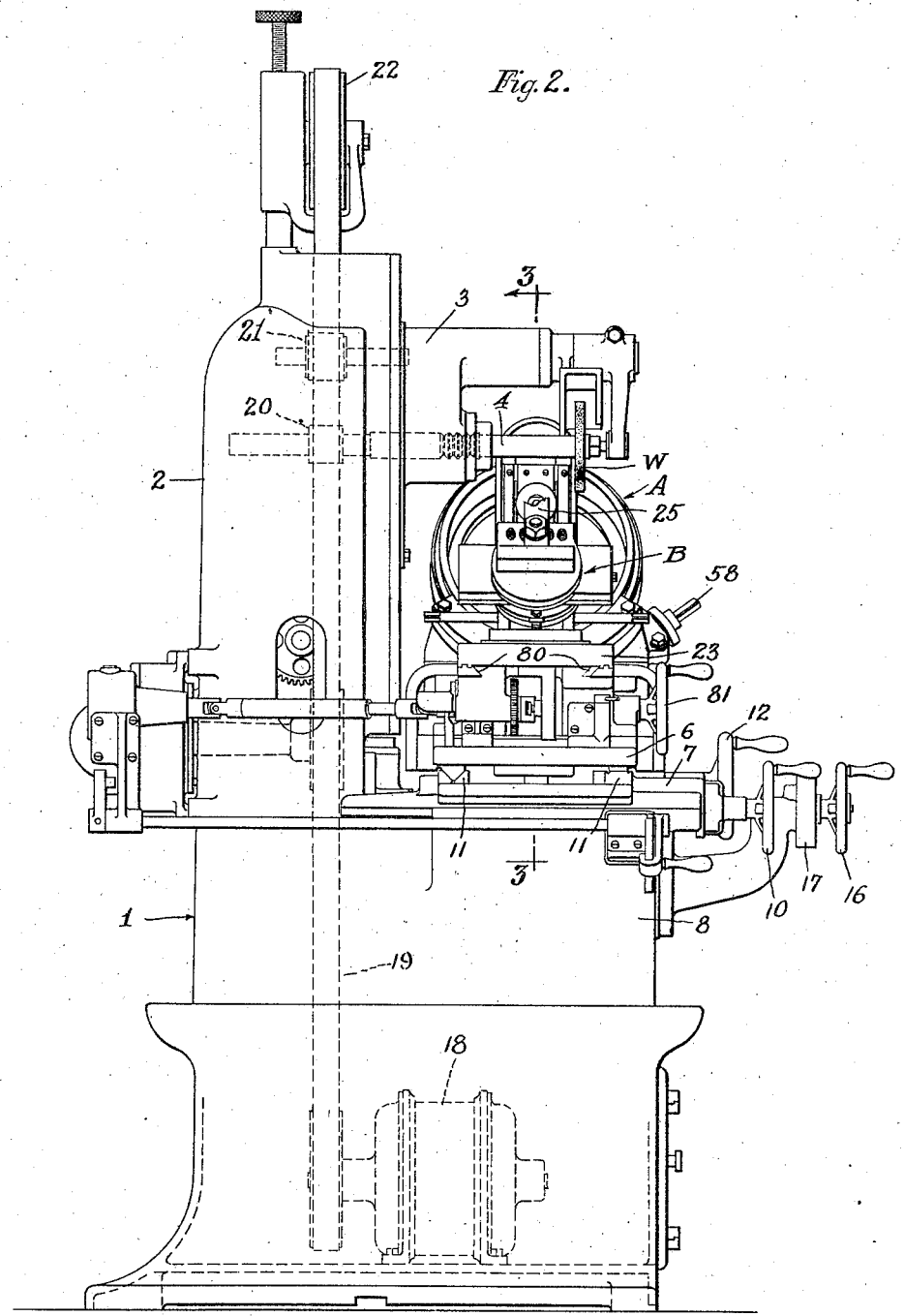

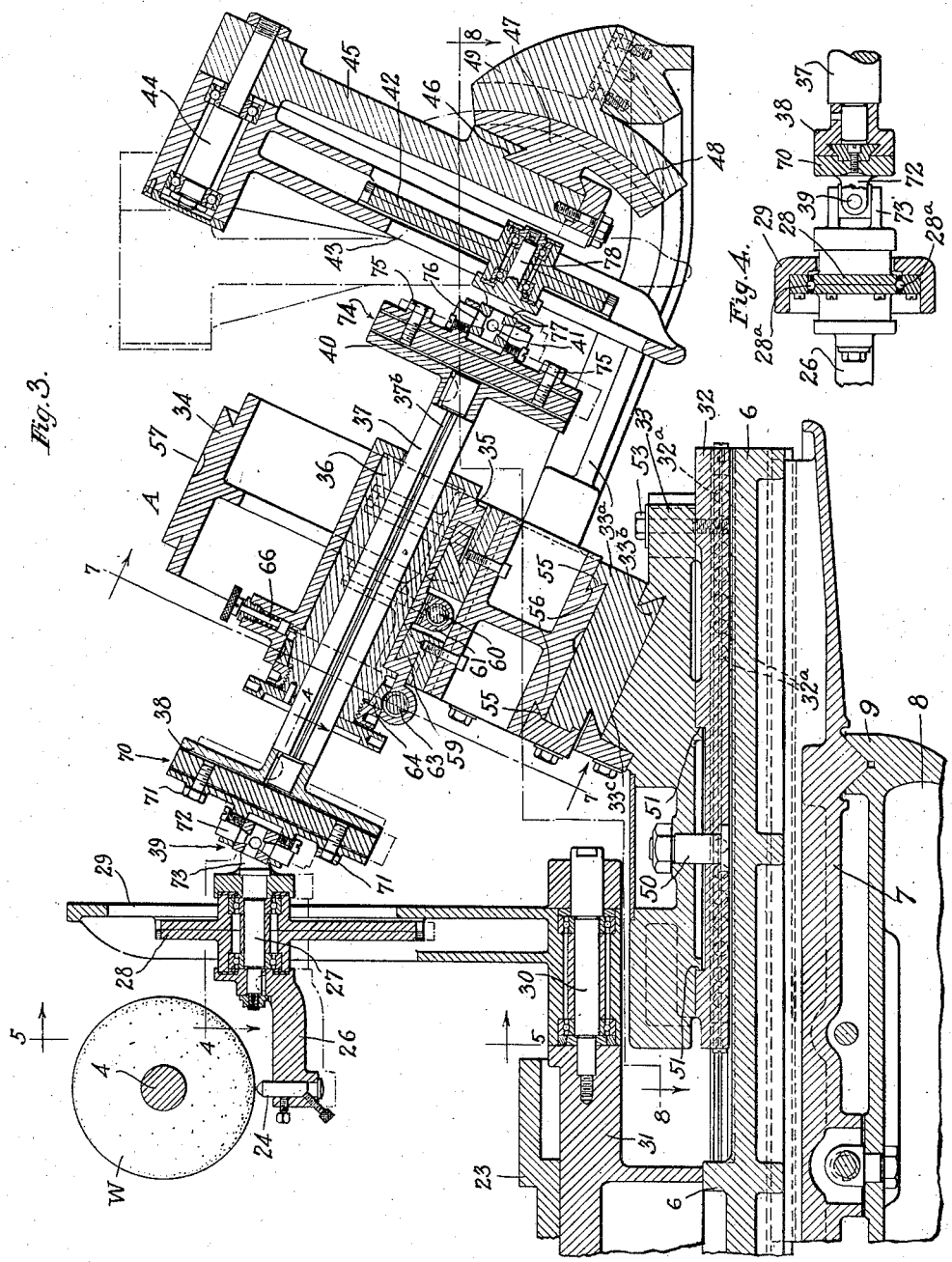

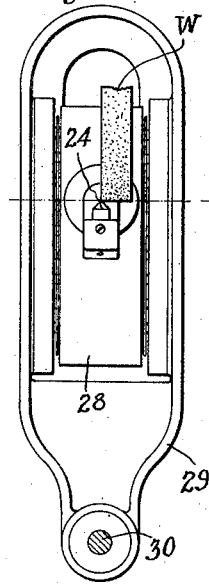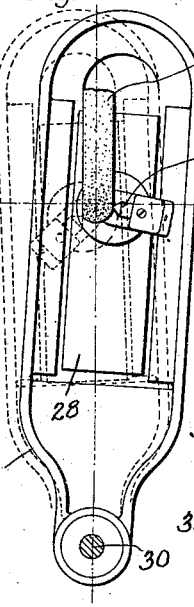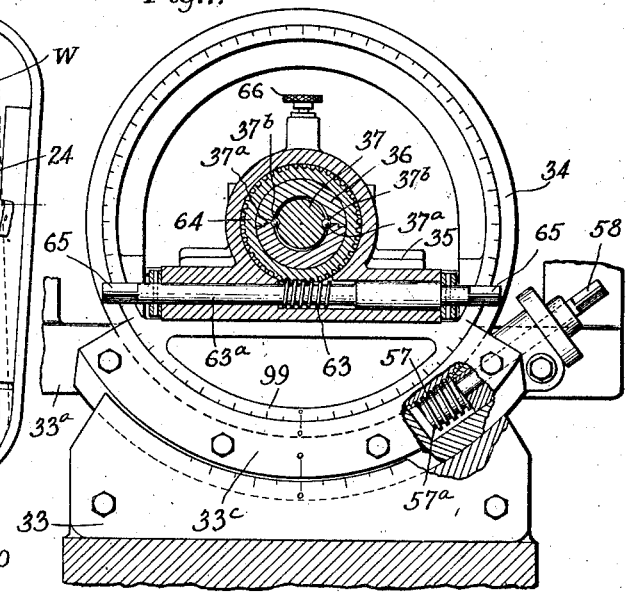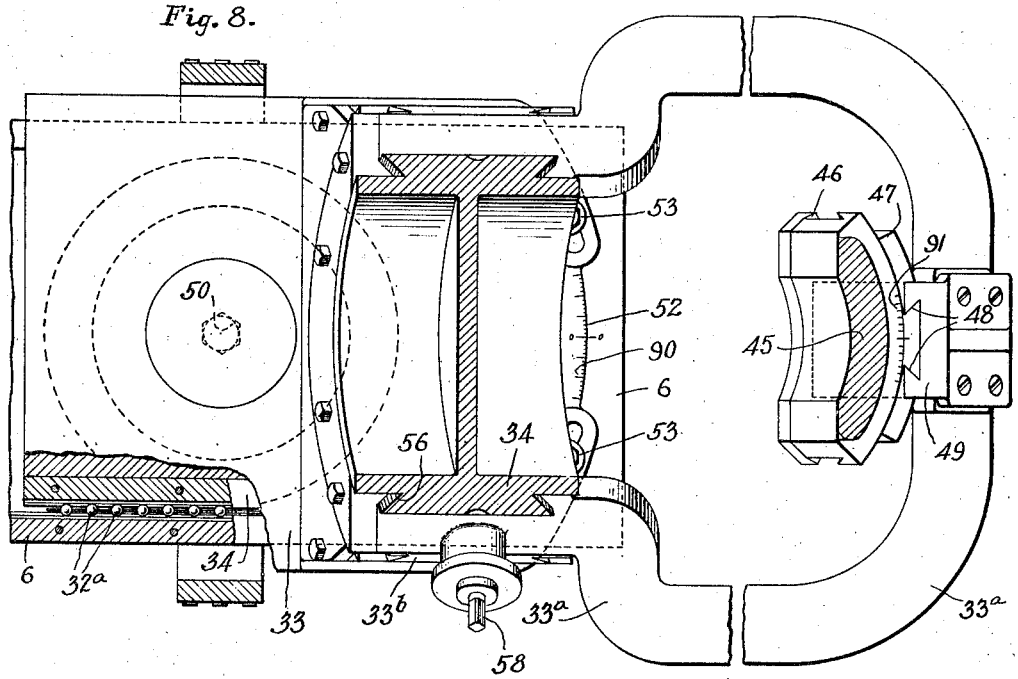

INVENTOR
John Edgar
BY
ATTORNEYS

Nov. 6, 1934.  J. EDGAR  1,979,536
TRUING DEVICE FOR GRINDING WHEELS
Filed Feb. 28, 1929    7 Sheets-Sheet 6
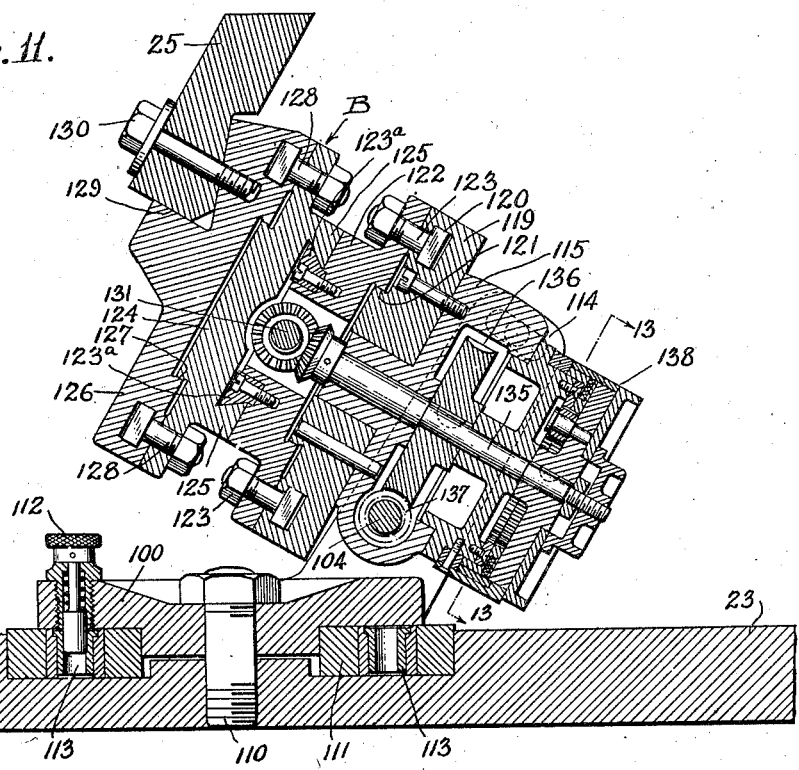
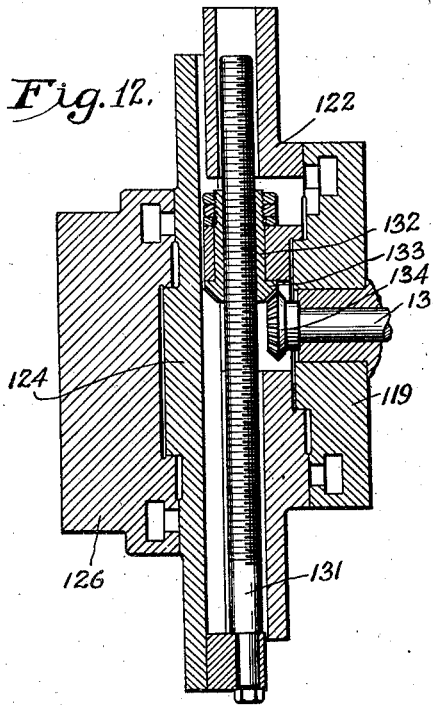
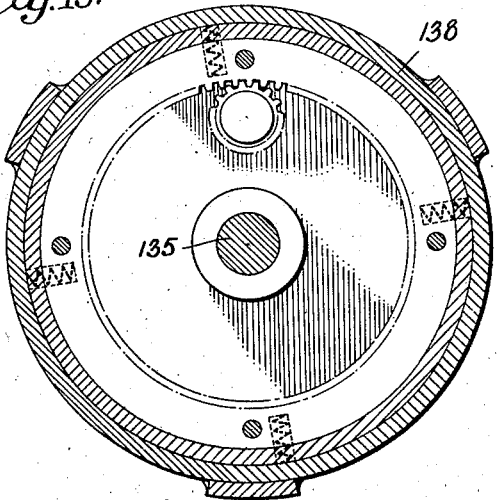
INVENTOR
John Edgar
BY
ATTORNEYS Nov. 6, 1934.   J. EDGAR   1,979,536
TRUING DEVICE FOR GRINDING WHEELS
Filed Feb. 28, 1929   7 Sheets-Sheet 7

Inventor
John Edgar
By Chindahl, Parker & Carlson
Att'ys

Patented Nov. 6, 1934

1,979,536

UNITED STATES PATENT OFFICE 1,979,536

TRUING DEVICE FOR GRINDING WHEELS

John Edgar, Rockford, Ill., assignor to Barber-Colman Company, Rockford, Ill., a corporation of Illinois Application February 28, 1929, Serial No. 343,451

29 Claims. (Cl. 125—11)

This invention relates to a method for making form tools and novel mechanism embodying work supporting and grinding means and means for guiding a tool or other device in straight, curved and modified paths particularly adapted for employment in the manufacture of such form tools. This application is a continuation in part of applicant's copending application Serial No. 80,471 filed January 11, 1926.

There are two principal methods commonly used in the manufacture of form tools, the older of which is the so-called master or fly-tool method. To produce a form tool by this method, it is necessary to make, first, a master or fly-tool which possesses the shape that is desired to be produced by the form tool, but since this fly-tool is made from a piece of unhardened metal and is hardened after being properly shaped, any hardening distortion must be removed by a manual process such as stoning. This method has many disadvantageous features besides being costly.

In view of this, another method has been advanced whereby form tools are ground from hardened pieces of metal by means of abrasive wheels shaped to the proper contour. To correctly shape such an abrasive wheel it has been the custom to employ a templet to which the wheel was trued, the form of the templet not being a duplicate of the form desired but corresponding to the form desired as corrected to compensate for the clearance angle with which the tool is made, undercut and side clearance or any of them as may be desired on form tools for making straight gash or spiral gash cutters. It results, therefor, as will be more fully described hereinafter, that to make a form tool adapted to produce a circuit section, it is necessary that the contour of the abrasive wheel used be elliptical, if end clearance alone is to be compensated for, and the contour of the abrasive wheel must be further modified to compensate for the other factors.

It is an object of the present invention to provide a new, improved and simplified truing device for grinding wheels adapted for use in making form tools, and arranged to dress the wheel not only to compensate for the end clearance angle but also to compensate for undercut and side clearance as may be desired on form tools for making straight gash or spiral gash cutters.

Another object is to provide a novel mechanism whereby a dressing device may be moved through modified circular paths without the need of extensive mathematical computations or the use of templets.

Another object is to provide an adjustable mechanism having means for supporting a truing device for abrasive wheels and embodying means for guiding said device through the curve of the proper ellipse upon the mechanism being adjusted in accordance with the radius of the circular form desired to be produced by the form tool.

Another object is to provide such a mechanism embodying readily adjustable means for compensating for undercut and spiral angle.

Further objects and advantages of the invention will become apparent as the description proceeds.

In the drawings:

Fig. 1 is a front elevation of a machine embodying the preferred form of the invention.

Fig. 1a is a diagrammatic view of a form tool and a grinding wheel adapted to move at a clearance angle with the plane perpendicular to the cutting surface of the tool.

Fig. 2 is a side elevation looking at the left hand side of Fig. 1.

Fig. 3 is a fragmental section through the table, work support and tool support, taken in the plane of line 3—3 of Fig. 2.

Fig. 4 is a view along the line 4—4 of Fig. 3.

Fig. 5 is a view along the line 5—5 of Fig. 3.

Fig. 6 is a similar view with the tool holder in a different position.

Fig. 7 is a view along the line 7—7 of Fig. 3.

Fig. 8 is a fragmentary plan view of the undercut control shown along the line 8—8 of Fig. 3.

Fig. 11 is a vertical section along the line 11—11 of Fig. 12.

Fig. 12 is a section along the inclined line 12—12 of Fig. 9.

Fig. 13 is a section along the line 13—13 of Fig. 11.

Figure 9:
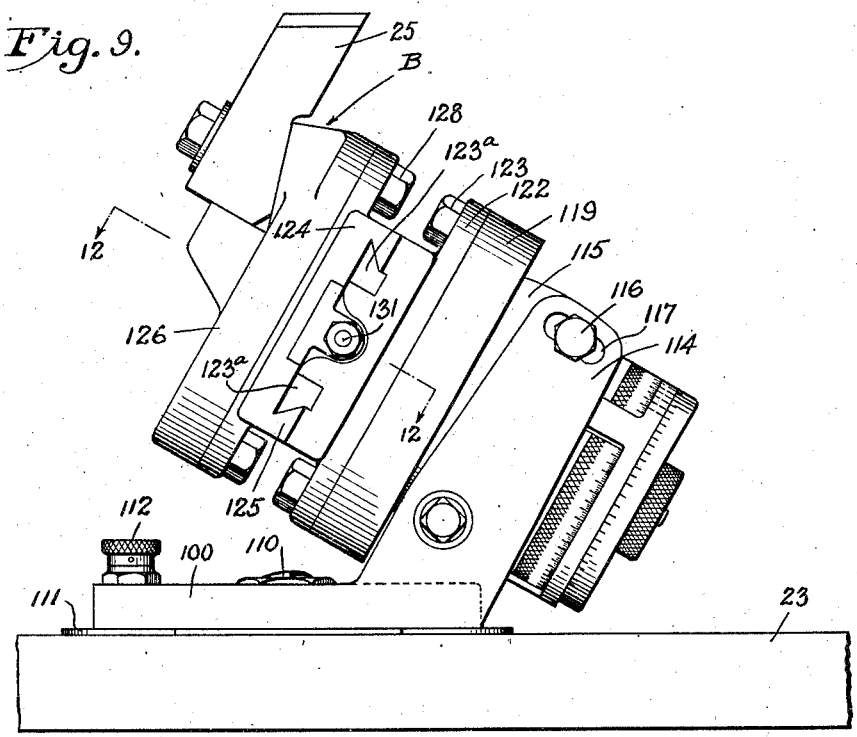
Fig. 9 is a front elevation of the mechanism for mounting the tool blank.
Figure 10:
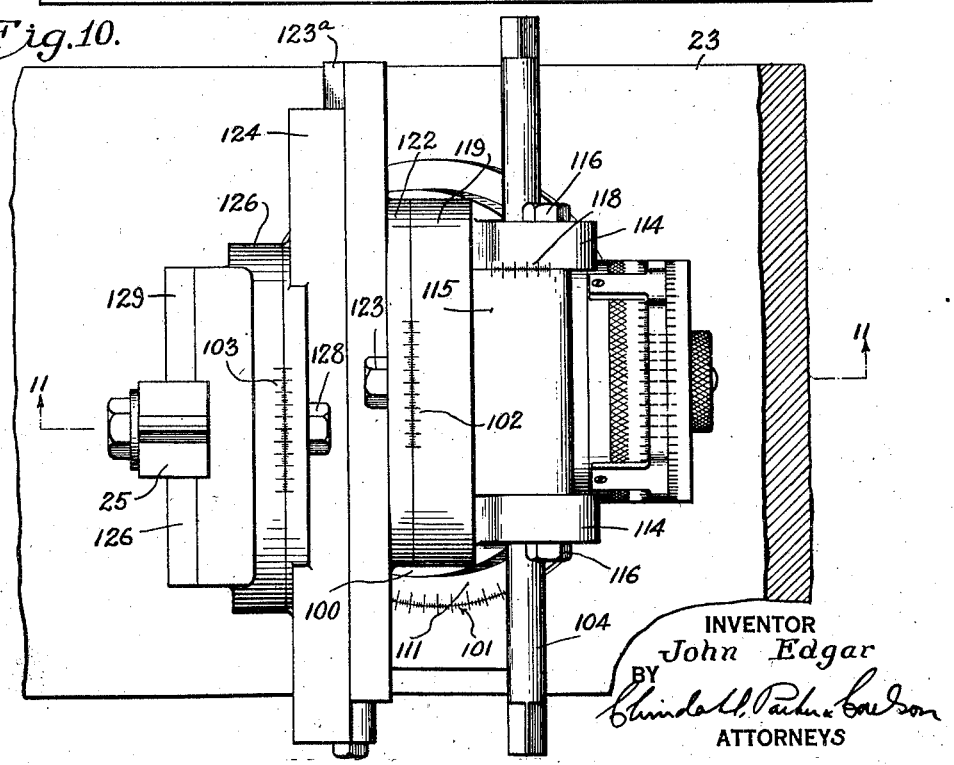
Fig. 10 is a plan view thereof.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

As illustrated in the drawings the invention in its exemplary embodiment is disclosed in connection with a grinding machine comprising a bed or base 1 having a column 2 formed integrally therewith and extending upwardly from the rear portion thereof. A spindle head 3 is slidably mounted on the column and has an arbor or spindle 4 rotatably mounted thereon and extending forwardly from the face of the column and over a platen or table 6 which is movable transversely of the spindle above the knee portion 8 of the machine base. Preferably a saddle 7 is interposed between the knee and the table, which saddle is adjustable longitudinally of the spindle 4 on ways 9 by means including a manually operable hand wheel 10. The table 6 is slidable on the saddle transversely of the spindle on ways 11 by means including a manually operable hand wheel 12. The hand wheel 12 may be secured to one end of a shaft 13 (Fig. 1) the other end of which may have a pinion and rack connection (not shown) with the table. The spindle head 3 is adjustable vertically by means including a hand wheel 16 (Figs. 1 and 2) which hand wheel drives through a micrometer device (designated generally as 17), and suitable gearing intermediate said micrometer device and the spindle head (not shown). Said micrometer device, the function of which will be more fully explained hereinafter may be of any suitable form and preferably of the type shown in my copending application Serial No. 377,391 filed July 11, 1929, and issued as Patent No. 1,760,938 on June 3, 1930.

The construction of the machine thus far described (with the exception of the micrometer device 17 referred to in said patent), is well known to those skilled in the art, the spindle 4 being generally driven from a motor 18 in the base of the machine by means of a belt 19, which belt engages a pulley 20 on the spindle shaft and suitable idler pulleys 21 and 22 for permitting vertical adjustment of the head on the column.

The invention contemplates that a dressing mechanism A will be mounted on one end of the table 6 and that a tool blank or work holder B will be mounted on a work support 23 slidably mounted on the left hand portion of the table so that by manipulating the hand wheel 12 to move the table 6, a dressing tool 24 may be moved into and out of operative relation to the grinding wheel W and when the dressing tool has been moved into an inoperative position a tool blank 25 mounted in the work holder B may be reciprocated transversely of the grinding wheel axis for grinding the blank to the contour which has been formed on the wheel W by the dressing tool. The work holder B will be more fully described hereinafter. Attention will now be directed towards the dressing mechanism generally designated A.

When grinding form tools it is necessary to make allowance not only for the end clearance angle to which the tool is ground, but in addition it is sometimes desirable when grinding straight gash tools to provide for undercut or side clearance or both and when grinding spiral gash tools to provide for the spiral, for undercut and for side clearance. The invention contemplates that the dressing mechanism A will embody devices operating on the same principle as that disclosed in the hereinbefore mentioned prior application for compensating for the end clearance angle and that it will embody devices adapted to modify the path of the dressing tool 24 to compensate for side clearance, undercut and spiral angle and that the tool blank 25 will be positionable by means of the work holder B to be ground to the desired end clearance angle and for side clearance.

In Fig. 1a the form tool 25 is shown diagrammatically in operative relation with a grinding wheel, the tool being presented to the grinding wheel to provide the tool with an end clearance of angle $a'$. It will be apparent that if the dimension $x$ represents the depth or radius of the cut desired to be reproduced by the tool, it will be necessary to make the depth $y$ measured perpendicular to the clearance end of the tool slightly less than the depth $x$ because of the angular position of the tool during grinding, the dimension $y$ being equal to $x$ multiplied by the cosine of the angle $a'$. In other words, the contour to be ground on the tool will be that of an ellipse which ellipse is the projection on a vertical plane of the inclined semi-circle of radius $x$ which defines the cutting edge of the tool.

Thus, the angle $a'$ is a clearance angle. A clearance angle may be defined as the angle of recession of the surface of a tool back of its cutting edge relative to a line through said edge extending in the direction of movement of the tool relative to the work. If the recession is on the end of the tool, as in the present instance, it has end clearance; if on the side, it has side clearance.

The invention contemplates a holder 26 (Figs. 1 and 3) for the dressing tool 24 which holder is freely movable and constrained to move in a vertical plane, together with a head mounted for movement on an axis inclined at the end clearance angle with the horizontal, a connection between the tool holder and the head such that when the head is turned on its inclined axis, the tool holder 26 will be moved through a curved path which is a horizontal projection of the path of the head, and means to modify the path of the dressing tool to compensate for side clearance, undercut and spiral angle as may be desired. The spiral angle of a form tool is the equivalent of the helical angle at the pitch line of the rotary cutter to be produced. In the form tool, this spiral angle is the angle of inclination of the cutting face laterally of the tool. The undercut in a form tool is the angle of inclination of the cutting face longitudinally of the tool. In the case of a rotary cutter, the undercut is the angular offset of the cutting face from a radial plane through the cutter axis. The form tool for cutting a rotary cutter having an undercut face, may itself have no undercut, but in such instance has a form compensated for the undercut on the cutter to be produced.

In each case of a spiral angle, an undercut, and/or a clearance angle, the effective contour of the grinding wheel on the work is foreshortened in some respect. This foreshortening is compensated for by so changing the contour of the grinding wheel that the foreshortened or distorted form which is applied to the work will be the desired form.

In the preferred embodiment of the invention as illustrated herein, the tool holder 26 (Figs. 1 and 3) is mounted on a shaft 27 which is journaled on a horizontal axis on a slide 28 supported on a swinging head or arm 29. The arm 29 is herein shown mounted swingably upon a pivot 30 which is secured to an uprising portion 31 of the table 6. The slide 28 is freely movable radially on the swinging arm or head 29 and is preferably mounted on ball bearings 28ª (Fig. 4) so as to eliminate static and sliding friction. Thus the tool holder is freely movable and is constrained to move in a vertical plane by the arm 29 and slide 28 and may be guided and operated by means of the shaft 27.

The dressing mechanism comprises generally such means for supporting the tool holder 26 and means for guiding and moving the tool holder through the desired paths. This last means, in the exemplary form illustrated in the drawings, includes a support 32 slidable longitudinally on the table 6. A side clearance control base 33 is pivoted on said support 32 and carries a frame 33ª (see Figs. 3 and 8) on which an annular member or barrel 34 is rotatably mounted on an axis inclined at the end clearance angle with the horizontal. A cross slide 35 adjustably mounted within said barrel for movement transversely of its axis carries a rotatably mounted sleeve 36 in which a shaft 37 is slidable axially. A head, guide or radius bar 38 (Fig. 4) on one end of said shaft has a universal connection 39, preferably of a ball and socket type, with the shaft 27 on which the tool holder 26 is mounted.

To compensate for spiral angles and undercutting the opposite end of the shaft 37 carries a second radius bar 40 having a universal connection 41 with a slide 42 movable radially on a swinging control arm 43 which is pivoted on an inclined axis parallel to the shaft 37. The pivotal mounting for the arm comprises a pin 44 positioned in the upper end of an adjustably mounted spiral angle control member 45, which member is angularly adjustable upon arcuate ways 46 (Figs. 3 and 8) about an axis perpendicular to the shaft 37. These ways are formed on an undercut control member 47 which in turn is angularly adjustable about an axis perpendicular to the shaft 37 and to the axis of the ways 46, on arcuate ways 48 formed on a control support 49 mounted on the end of the frame 33ª.

The support 32 is slidably mounted upon the table 6 for movement transversely of the spindle 4 and is preferably mounted on the table by means of balls 32ª or other anti-friction bearings so as to eliminate as far as possible static friction. This provides a freely slidable perpendicular connection between the guiding and compensating means and the tool holder 26 adapted to project onto the vertical plane of the tool holder, the curve through which the ball or joint 39 is moved when positioned radially outward of the axis of shaft 37 since the ball is constrained to move in a plane parallel to that of the tool holder. The side clearance control base 33 is pivotally mounted on the support 32 by means of a pivot pin 50 and an annular way 51. A protractor 52 (Fig. 8) is provided to determine the amount of side clearance by the position of the base 33, clamping bolts 53 being adapted to secure the base in its adjusted position.

The frame 33ª has a segmental portion 33ᵇ mounted on an arcuate way 33ᶜ on the base 33, and comprises a U-shaped end portion (Fig. 8) extending to the right in the drawings from the segmental portion. The arcuate way 33ᶜ is concentric with the shaft 37.

The frame 33ª is also provided with arcuate ways 55 concentric with the shaft 37, which ways are arranged to support and guide the barrel 34, the periphery of which is provided with a corresponding guide 56. The periphery of the barrel is also provided with worm wheel teeth 57 (Figs. 1 and 7) engageable by a worm 57ª on a manually operable shaft 58 rotatably mounted in the base frame 33ª.

The cross slide 35 is mounted on rectilinear ways 59 extending transversely of the barrel so that the shaft 37 may be moved diametrically across the barrel. A cross feed screw 60 (Figs. 1 and 3) is arranged to engage a nut 61 on the cross slide for adjusting the cross slide transversely of the barrel and has a squared outer end 62 for engagement by a suitable handle.

The sleeve 36 which is rotatably mounted on the cross slide 35 is suitably secured against longitudinal movement and may be rotated by means of a manually operable worm 63 cn a shaft 63ª (Figs. 1, 3 and 7) which engages a worm wheel 64 secured to the sleeve and has squared outer ends 65. The sleeve may be locked in its normal position by means of a spring operated plunger 66.

The shaft 37 is freely slidable longitudinally in the sleeve 36 and may be secured against rotation relatively to the sleeve by a suitable spline connection preferably anti-friction in character, as, for example, balls 37ª (Fig. 7) operating in grooves 37ᵇ.

The radius bars 38 and 40 are secured to the opposite ends of the shaft 37 and positioned in a common longitudinal plane through the shaft axis. The radius bar 38 at the left hand end of the shaft (Fig. 3) has a slide 70 which is adjustable radially thereon and which may be secured in its radially adjusted position by means of suitable clamping bolts 71 (Fig. 1). This slide 70 supports one member 72 of the universal joint 39, the other member 73 of which is secured to the tool holder shaft 27.

The radius bar structure, swinging arm and slide on the right end of the shaft 37 (Figs. 1 and 3) may be duplicates of those shown for the left hand end and just described. Thus the radius bar 40 is provided with a slide 74 adjustable radially thereon and adapted to be secured in adjusted position by means of bolts 75. This slide carries one member 76 of the universal joint 41, the other member 77 of which is secured to a shaft 78 rotatably mounted on the slide 42 which is freely movable radially on the swinging arm 43. The swinging arm in this instance is mounted on the inclined pivot pin 44.

The work support 23 is slidably mounted on the uprising portion 31 of the table 6 along ways 80 for movement transversely of the grinding wheel spindle 4 so that after the grinding wheel W has been properly dressed, the tool blank holder B may be traversed across the grinding wheel without moving the table. This traverse movement may be imparted to the work support 23 manually by any suitable means, which means preferably includes a hand wheel 81 rotatably mounted on the table portion 31 and readily accessible to an operator standing in front of the machine.

The work support B, as disclosed herein, is adapted to support the tool blank 25 in any one of a number of desired positions for making form tools of various types as described more fully hereinafter. In its exemplary form, this device comprises a circular base 100 rotatably mounted on the upper surface of the support 23 by means of a pivot bolt 110 and an annular guide ring 111. The guide ring may be adjusted angularly with respect to the support 23 as indicated on a scale 101 and may be secured in its adjusted position by means of the pivot bolt. A spring pressed plunger or index pin 112 carried on the base 100 is adapted to engage either one of two sockets 113 positioned 180° apart in the ring 111. Extending upwardly from the base 100 and formed integrally therewith are a pair of inclined brackets 114. A body member 115 is positioned intermediate said brackets and pivotally mounted on a horizontal shaft 104 mounted in the brackets. As hereinafter more fully set forth said pivotal mounting is provided for permitting modification of the end clearance angle to which the tool blank 25 is ground, the upper portion of the member 115 carrying clamping bolts 116 passing through slots 117 in the brackets 114 to secure the body member in its adjusted position as determined by a scale 118.

A centrally apertured disk 119 is secured to the body member 115 and is provided with an annular T-slot 120 and a central boss 121. An angularly adjustable member 122 has a shoulder engaging said boss and carries a plurality of bolts 123 with their heads in said T-slot so that the head 122 may be clamped in its adjusted position on the disk 119 as determined by an indicating scale 102. The head 122 is provided with rectilinear guides 123ª normally positioned horizontally and carrying a cross slide 124 having corresponding ways 125. A somewhat circular tool blank supporting member 126 is angularly adjustable on the cross slide 124, being positioned thereon by means of a boss 127 on the cross slide and being adapted to be clamped in its adjusted position, as determined by a scale 103, by means of a plurality of bolts 128. Suitable means, such for example as a notch 129 and clamping bolt 130, may be provided for securing the tool blank 25 to the supporting member 126.

The cross slide 124 may be adjusted on the guides 123 to displace the tool blank longitudinally of the grinding spindle 4 by means of a feed screw 131 non-rotatably supported on the cross slide and engaged by a nut 132 rotatably mounted on the head 122. This nut is provided with a bevel pinion 133 which engages a second bevel pinion 134 mounted on one end of a shaft 135. This shaft carries a worm wheel 136 which meshes with a worm 137 on the shaft 104 so that by rotating the shaft, the cross slide may be actuated.

The shaft 135 preferably extends outwardly of the body member 115 to operate a micrometer device designated generally 138 by which the position of the cross slide may be indicated. The amount of the displacement of the tool blank by movement of the cross slide may be determined by the difference between the two readings on the micrometer device 138.

With all of the parts in their normal or zero positions, that is with the slides 70 and 74 centrally on the radius bars, the cross slide 35 centrally of the barrel 34, the barrel with the cross slide ways horizontal, and the spiral angle control support 45, the undercutting angle control member 47, the side clearance control base 33 and the frame 33ª in their central positions, rotation of the shaft 37 by means of the sleeve 36 and worm shaft 63 will pivot the tool holder 26 without swinging the arms 29 or 42 or moving the slides 28 and 42, the dressing tool merely pivoting about an axis through its point. Protractors or scales are preferably provided on the various parts to facilitate their adjustment.

As described hereinbefore, the dressing mechanism A and the tool blank or work holder B are generally constructed at a standard or desired end clearance angle, the dressing mechanism being so set to compensate for the modified form required on the grinding wheel because of the end clearance angle, and the work holder being so set to grind the tools to the desired clearance angle. Form cutters of the straight gash type are the simplest for which to grind form tools. The setup of the machine for grinding form tools for this type of cutter will therefor be described first.

The setup of the tool blank is particularly simple as the work holder, with the protractors indicating zero, holds the tool blank parallel to the table 6 and perpendicular to the grinding wheel spindle. The dressing mechanism is also set at zero except to the angle of form. Thus the protractors 90, 91 and 92 on the side clearance, spiral angle and undercutting controls respectively are at zero and the slides 70 and 74 are central of the radius bars 38 and 40 respectively, as illustrated herein. The dressing fixture is set to the desired angle of form by rotating the barrel 34. With the dressing tool in the vertical plane through the axis of the wheel W, feeding movement of the dressing tool may be accomplished by actuating the cross slide 35, the head 3 being lowered to cause the tool to engage the wheel.

For straight gash cutters with undercut faces, the setting of the dressing mechanism is the same except that the undercut control member 47 is set at an angle of negative rake. The negative rake referred to is not the undercut angle on the cutter but is the angle to which it is necessary to dress the grinding wheel to give the proper foreshortening on the form tool. The angle is a function of the undercut angle on the cutter, the clearance angle on the form tool, the clearance angle on the cutter tooth and the diameter of the cutter. An empirical equation can readily be set up and by means of a simple calculation, the proper angle for setting the undercut angle control member 47 may be obtained.

For grinding a straight gash cutter form tool with side clearance the tool blank to be ground is set at an angle other than the standard clearance angle depending upon the angle of side clearance. The head 126 is set at a slight angle to the vertical about the inclined axis of the work holder, this angle corresponding to the angle of side clearance. The tool blank is also swung horizontally at a sufficient angle on the scale 101 to give the proper side clearance angle. The form dressed upon the grinding wheel is the same as for straight gash cutters, the position of the tool blank while being ground making provision for obtaining the desired shape on the face of the tool.

In order to grind form tools for straight gash cutters having both side clearance and undercut faces, the tool blank is set the same as for grinding form tools with side clearance and the dressing fixture is set the same as for dressing grinding wheels for cutters with undercut faces. This combination dressing of the grinding wheel for undercut and positioning the tool blank for side clearance produces a form tool the face of which is correct for cutting this type of cutter.

To grind tools for spiral gash cutters the tool blank is set at the standard end clearance angle with the protractors of the work holder set at zero. The head 126 is set at the tip angle corresponding to the clearance and gash angles. In the dressing mechanism the spiral control member 45 is set at the angle of the required gash. Since the head 126 is tipped the tool blank is brought to the proper height to compensate for the spiral gash.

When grinding tools for spiral gash cutters with undercut faces the tool blank is set as for spiral gash cutter tools as just described. The dressing mechanism, in addition to having the spiral control member 45 set as just described, also has the undercut control member 47 set at the required angle of negative rake.

In grinding form tools for spiral gash cutters with side clearance the head 126 of the tool holder is set at an angle to the vertical depending upon whether right or left hand spiral gash as well as whether right or left hand side clearance is desired, after which the tool blank is swung horizontally about the pivot 110 through the angle corresponding to the required side clearance angle. The dressing mechanism is then swiveled on its pivot 50 so that the axis of the barrel 34 is perpendicular to the back of the tool blank and the spiral control member 45 is set parallel with the face of the tool blank, the angle of which will be either the combined angles of spiral and side clearance or their difference.

For grinding form tools for spiral gash cutters with both undercut faces and side clearances the tool blank is set as described for form tools for spiral gash cutters with side clearance. The dressing mechanism is set as described, and with the undercut control member 47 set at the proper angle.

As the operation of the machine in dressing wheels and grinding tools varies with the type of the form tool, I will describe the operation in connection with the grinding of a form tool having a contour such as that illustrated in Figs. 14a to 18a.

In Figs. 14a to 18a there is illustrated diagrammatically a tool having a form comprising six parts, namely a horizontal top $a$, a vertical land $b$, and arc $c$, an angular portion or tangent $d$, an arc $e$, and a second angular portion or tangent $f$. Arcs $c$ and $e$ are struck from two centers $k$ and $i$, the top $a$, and land $b$ and the tangent $d$ being taken from the center $k$ while the tangent $f$ is taken from the center $i$. Figs. 14 to 18 illustrate diagrammatically the different grinding wheels which are dressed to proper form to grind the six component parts of the contour of the tool together with the paths of the dressing tool during the dressing operations.

Figure 14:
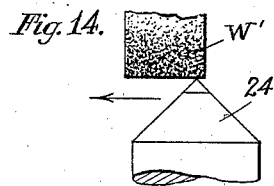
Figs. 14 to 18a are diagrammatic views exemplifying a practical application of the preferred embodiment of the invention in dressing grinding wheels and shaping a form tool.

The grinding wheel W' shown in Fig. 14 is adapted to grind the top $a$ on the tool. This grinding wheel is dressed by setting the radius slides 70 and 74 opposite the distance $m$ (Fig. 14a) of this surface from the center $k$ (upwardly in Fig. 3) and with the angle barrel 34 positioned so that the cross slide 35 moves horizontally, the table 6 is moved so that the dressing tool 24 lies in a vertical plane through the axis of the grinding wheel spindle 4. The grinding wheel head 3 is then lowered to feed the grinding wheel into engagement with the dressing tool while the cross slide 35 is reciprocated by means of the feed screw 60 to move the dressing tool back and forth across the face of the grinding wheel. When the spindle head 3 has been fed downwardly to its final position (the position wherein the wheel W' is dressed) the dial upon the micrometer device 17 is set at zero, whereupon the spindle head is raised out of the way.

The tool blank which is mounted in the holder B at the end clearance angle, is then moved into operative relation with the grinding wheel by moving the table 6 by means of the hand wheel 12. The work support 23 is then actuated by means of the handle 81 so that the work holder is traversed while the spindle head 3 is fed downwardly until the top $a$ is properly ground, whereupon a record is made of the reading of the dial of the micrometer mechanism 17.

Figure 15:
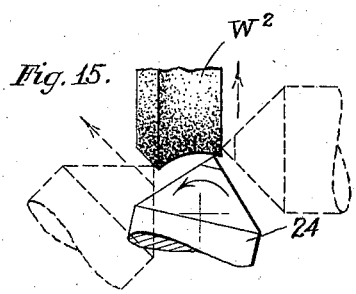

The table 6 is now returned to reposition the dressing tool 24 in a vertical plane through the grinding wheel spindle axis preparatory to dressing a wheel as illustrated in Fig. 15 for grinding parts $b$ and $c$ on the tool. The dressing mechanism is now set up using the same center $k$ but changing the offset of the radius slides 70 and 74 downwardly on the radius bars 38 and 40 to that of the distance $n$ of the land $b$ from the center $k$. A grinding wheel $W^2$ properly positioned on the spindle 4 is then dressed along its side by first revolving the angle barrel 34, 90° (clockwise looking from the left in Fig. 3) and then reciprocating the dressing tool 24 by means of the cross slide 35, the head 3 being fed down to dress the side of the wheel a sufficient distance in from the periphery.

Figure 15A:
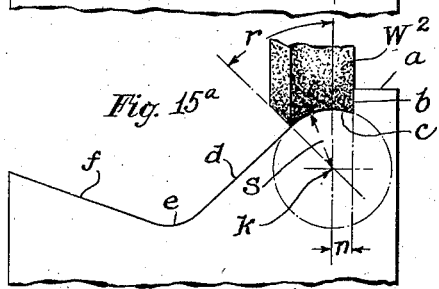

The head 3 is then withdrawn, the radius slides are set central of the shaft 37 and the barrel 34 is rotated until the dial 99 thereon registers at an angle $r$ (Fig. 15a) whereupon the side $z$ of the wheel $W^2$ is dressed by reciprocating the cross slide 35 while the spindle head 3 is fed vertically downward until the micrometer indicates zero. The arc $c$ is dressed on the wheel by first setting the radius slides 70 and 74 upwardly (in Fig. 3) to the radius $s$ of the arc, the cross slide 35 and barrel 34 being then in their central or zero positions. The radius bar is then oscillated (after unlocking the pin 66), by means of the worm and worm wheel control 65 for the sleeve 35, the spindle head 3 being fed downwardly until the dial on the micrometer mechanism indicates zero. As the wheel $W^2$ for grinding the parts $b$ and $c$ is now dressed the head 3 is raised and the table is actuated to bring the tool blank into operative relation with the wheel. Then while the work holder 23 is traversed to reciprocate the tool blank across the grinding wheel the spindle head is fed downwardly until the dial on the micrometer 17 registers identically with the reading recorded as the position of the head when the top part $a$ of the tool was ground.

Figure 16:
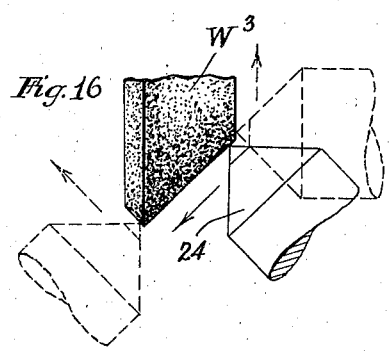
Figure 16A:
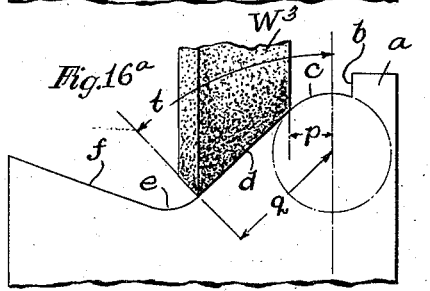
Figure 17:
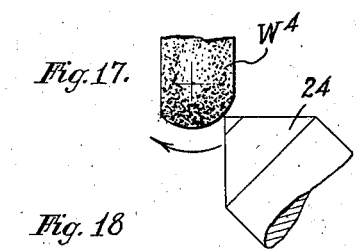
Figure 17A:
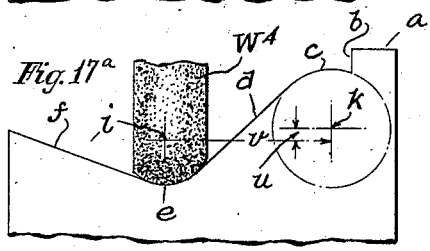
Figure 18:
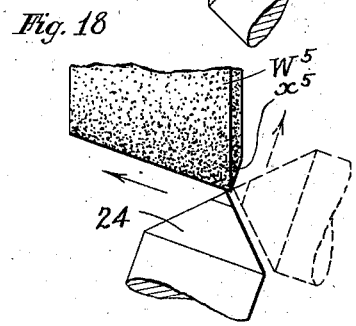
Figure 18A:
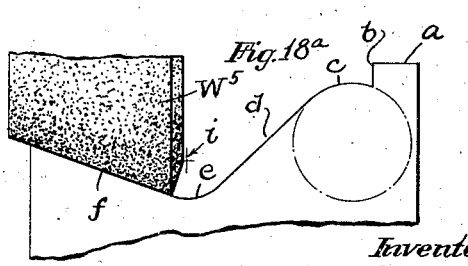

As the tangent face $d$ as illustrated requires a wider wheel, a wheel $W^3$ is properly positioned on the spindle 4. With the radius slides 70 and 74 offset the distance $p$ (upwardly in Fig. 3) and the barrel 34 revolved 90°, (clockwise, Fig. 7) the wheel $W^3$ is faced off on the right hand side by reciprocating the cross slide 35. The radius slides are then offset downwardly (Fig. 3) the distance $q$ (Fig. 16a) and the barrel 34 is revolved (counter-clockwise in Fig. 7) through an angle $t$ from its zero position, whereupon the dressing tool is reciprocated by means of the cross slide 35 while the spindle head is fed downwardly to the zero point on the micrometer 17. The radius slides 70 and 74 are then offset again the radius $s$ of the arc $c$ after which the barrel is revolved to the angle for dressing the part $d$ which angle is the complement of angle $t$. The cross slide 35 is then reciprocated while the wheel $W^3$ is fed downwardly until the dial on the micrometer mechanism indicates zero. The table is then moved to bring the tool blank into operative relation with the grinding wheel after which the wheel is fed into the tool blank while the work support 23 is reciprocated until the dial on the micrometer mechanism 17 again indicates the final position of the head recorded upon completing the parts, a, b and c of the tool.

Another wheel $W^4$ is now positioned on the spindle 4 adapted to receive the proper contour for grinding the arc e. The dressing mechanism is then adjusted so that the radius slides are offset an amount equal to the radius of the arc e, the barrel 34 being in its zero position. The wheel is then dressed, the dressing tool being traversed by oscillating the sleeve 36 and the spindle head being fed downwardly. When the spindle head reaches its final position the dial on the micrometer mechanism 17 is set at zero as the arc e is to be formed on the center i which center is displaced from the center k by a horizontal distance v and a vertical distance u. The tool blank must likewise be displaced from its former position through a horizontal distance v (the vertical displacement being taken care of by movement of the spindle head 3). The horizontal displacement of the tool blank is accomplished by means of the work holder B after which the spindle head is fed downwardly while the tool blank is reciprocated until the dial on the micrometer 17 indicates the former recorded reading minus the distance u, multiplied by the cosine of the end clearance angle.

Figure 14A:
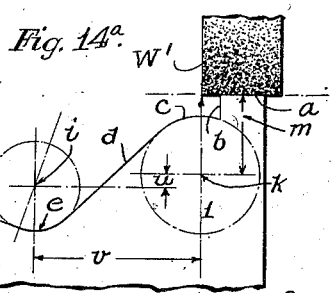

The table 6 is again returned to bring the dressing mechanism into operative relation with the grinding wheel, a different grinding wheel $W^5$ having been mounted on the spindle of sufficient size to grind the tangent surface f. The face $x^5$ (Fig. 18) is dressed on the wheel with the radius slides set at zero and the barrel 34 positioned at the angle $q'$ (Fig. 14a). The tangent f is likewise dressed on the wheel by first offsetting the radius slides to the radius of the arc e and positioning the barrel to an angle complementary to the angle $q'$. When the spindle head has been fed downwardly and the tangent f dressed on the wheel, the dial of the micrometer is again set at zero. As the tool blank has already been offset the horizontal distance v the tabel is moved to bring the tool blank into operative relation with the grinding wheel whereupon the blank is reciprocated past the wheel while the head 3 is fed downwardly to the same extent as for the wheel $W^4$.

I claim as my invention:

1. A device of the character described comprising, in combination, an oscillatory head, a slide thereon, a truing element on said slide, an oscillatory inclined guide, a slidable support therefor, a second slide adjustable on said guide, a universal joint connection between said two slides, and means for sliding said support.

2. A device of the character described comprising, in combination, an oscillatory head, a slide thereon, a tool operable by said slide, an oscillatory inclined guide, a slidable support therefor, a ball and socket joint comprising two members, one being carried by said slide and the other being mounted for radial adjustment on said guide, and means for actuating said support.

3. A device of the character described comprising, in combination, a tool, means to support said tool for movement in a plane, a head rotatable about an axis inclined to said plane, means for rotating said head, a slidable support for said head, and a universal joint comprising two members, one being connected to said tool and the other being carried by said head.

4. In a device of the character described comprising, in combination, two slides movable in planes at an angle to each other, means to guide one slide in a circular path in its plane, means to connect said slides comprising a ball and socket joint and a sliding joint perpendicular to the plane of movement of the other slide, and a tool operable by one of said slides.

5. A device of the character described comprising, in combination a tool holder, means to support said tool holder for movement in a plane, and means to move said holder through a curved path in said plane, said last mentioned means including a member rotatable about an axis inclined to said plane, and a connection between said member and said holder whereby upon movement of said member in a circular path about said axis, said holder moves in a curved path in said plane which is the projection of said circular path on said plane.

6. Means to guide a tool comprising, in combination, a radially extending member pivotally mounted on an axis, a head rotatably mounted on an axis inclined to said first mentioned axis, a tool holder slidably mounted on said head for movement in a plane perpendicular to its axis, a tool carried by said holder, means connecting said tool holder to said member comprising a universal joint having one part connected to the tool holder and a complementary part connected to said member, and means to constrain the pivot point of said universal joint to move in a plane parallel to said head during a rotary movement thereof.

7. In combination, an abrasive wheel rotatable about its axis, a truing device adapted to dress said wheel and movable in an axial plane of said wheel, and means to move said truing device in said plane across the face of said wheel in an elliptical path, said means comprising a head pivotal about an axis perpendicular to said plane, a tool holder slidable on said head and carrying said tool device, a second head rotatable about an axis intersecting said first axis, supporting means for said second head slidable perpendicularly to said plane, and a universal drive connection between said tool holder and said second head.

8. Means to guide a tool comprising two heads pivoted on angularly inclined axes, a part positioned on one head at a predetermined radius, a second part flexibly connected to said first mentioned part and movable on the other head, said second part being constrained to travel in a plane perpendicular to the axis of its head, and a tool holder mounted on said second part to move parallel therewith during a pivotal movement of said heads.

9. Means to guide a tool comprising, in combination, two members mounted on axes inclined to each other, a part on one of said members adjustable radially to a predetermined position with respect to its axis, a tool holder on the second of said members freely movable on the member on a plane perpendicular to its axis, a universal joint connecting said part to said tool holder, and means to constrain movement of the point of intersection of said members to a plane perpendicular to the axis of the said second member, thereby to guide the tool holder in an elliptical path in a plane perpendicular to the axis of said second member when said first member is rotated about its axis.

10. Means to guide a tool comprising, in combination, a pivotal head having a radially extending guideway thereon, a rotary head mounted on an axis intersecting the axis of said first head, a tool holder slidably mounted on said guideway, and a connection between said tool holder and a radially extending portion of said rotary head, said connection including means to constrain said radially extending portion from movement axially of said pivotal head.

11. A device of the character described comprising, in combination, a swingable support forming a radial guideway, a slide mounted on said guideway, a tool holder rotatably mounted on said slide, and means to guide said tool holder in an elliptical path, said means comprising a radially extending member pivotally supported on an axis intersecting the axis of said tool holder, a part adjustable radially on said member, supporting means for said member slidable perpendicularly to the plane of said swingable support, and rotary drive means connecting said tool holder with said part.

12. In combination, an abrasive wheel rotatable about its axis, a truing device adapted to dress said wheel movable in a plane longitudinally through said axis, and means to move said truing device across the face of said wheel in an elliptical path, said means comprising mechanism arranged normally to move said device in an elliptical path and means to modify said path to compensate for undercut.

13. In combination, an abrasive wheel rotatable about its axis, a truing device adapted to dress said wheel movable in a plane longitudinally through said axis, and means to move said truing device across the face of said wheel in an elliptical path, said means comprising mechanism arranged normally to move said device in an elliptical path and means to modify said path to compensate for a spiral angle.

14. A mechanism of the character described comprising, in combination, a tool holder, means to support said tool holder for movement in a plane, means to guide said tool holder through an elliptical path in said plane, and means to control said guide means arranged to modify said elliptical path to compensate for a spiral angle.

15. A mechanism of the character described comprising, in combination, a tool holder, means to support said tool holder for movement in a plane, means to guide said tool holder through an elliptical path in said plane, means to control said guide means arranged to modify said elliptical path to compensate for a spiral angle, and means to adjust said control means to modify said path to compensate for undercut.

16. A dressing mechanism of the character described comprising, in combination, an oscillatory head, a slide thereon, a tool holder rotatably mounted on said slide, an oscillatory guide inclined to said head, a slidable support for said guide, a universal joint connection between said guide and tool holder, an inclined oscillatory head carried on said support, a slide thereon, and a universal joint connection between said guide and last mentioned slide.

17. A dressing mechanism comprising, in combination, an oscillatory head mounted for movement in a plane, a slide thereon, a tool holder movably mounted on said slide, an oscillatory guide inclined to said head, a slidable support for said guide movable perpendicularly to said plane, a universal joint connection between said guide and tool holder, an inclined oscillatory head, a slide thereon, a universal joint connection between said guide and last mentioned slide, and an angularly adjustable support for said inclined oscillatory head carried on said slidable support.

18. A dressing mechanism comprising, in combination, an oscillatory head mounted for movement in a plane, a tool holder movably mounted thereon, an oscillatory radius bar inclined to said head, a slidable support for said bar movable perpendicularly to said plane, a universal joint connection between said bar and tool holder, an inclined oscillatory head, a slide thereon, a universal joint connection between said radius bar and said slide, an angularly adjustable member for supporting said inclined oscillatory head, and an angularly adjustable carrier for said member and mounted on said support.

19. A dressing device comprising, in combination, an oscillatory head, a tool holder movably mounted thereon, an oscillatory head relatively inclined to said first mentioned head, a slidable support for one of said heads movable perpendicularly to the plane of oscillation of the other of said heads, and a connection between said second mentioned head and said tool holder and embodying means operable during the oscillatory movement of said second mentioned head to move said slidable support.

20. A dressing device comprising, in combination, an oscillatory head, a tool holder movably mounted thereon, an oscillatory head relatively inclined to said first mentioned head, a slidable support for one of said heads movable perpendicularly to the plane of oscillation of the other of said heads, a connection between said second mentioned head and said tool holder and embodying means operable during the oscillatory movement of said second mentioned head to move said slidable support, and angularly adjustable means arranged to modify the movement of said support.

21. A device of the character described comprising, in combination, an oscillatory head, a tool holder mounted on said head, an oscillatory head relatively inclined to said first mentioned head, an angularly adjustable support for said last mentioned head, a slidable carrier for said support, means to adjust said last mentioned head diametrically of said angular support, and a drive connection between said holder and said last mentioned head.

22. A device of the character described comprising, in combination, a support, an annular member adjustably mounted on said support on an inclined axis, a slide movable diametrically of said annular member, a sleeve rotatably mounted on said slide, a bar slidable longitudinally in said sleeve, a tool holder, means for supporting said tool holder for movement in a plane perpendicular to said support, and drive means connecting said bar and tool holder.

23. A device of the character described comprising, in combination, a support, a base slidable thereon, an annular member adjustably mounted on said base on an inclined axis, a sleeve rotatably mounted in said member, a bar slidable longitudinally in said sleeve, a tool holder, means for supporting said tool holder for movement in a plane perpendicular to said support, a part adjustable radially on one end of said bar, means connecting said part and tool holder, a second part adjustable radially on the opposite end of said bar, an inclined oscillatory head adjacent said opposite end of the bar, a slide on said head, and means connecting said slide and said second part.

24. A device of the character described comprising, in combination, a support, a frame slidable thereon, an annular member adjustably mounted on said frame on an inclined axis, a sleeve rotatably mounted on said member, a bar slidable longitudinally in said sleeve, a tool holder, means for supporting said tool holder for movement in a plane perpendicular to said support, a part adjustable radially on one end of said bar, means connecting said part and tool holder, a second part adjustable radially on the opposite end of said bar, an inclined oscillatory head adjacent opposite end of the bar, a slide on said head, means connecting said slide and said second part, and an angularly adjustable support for said inclined oscillatory head carried on said frame.

25. A mechanism of the character described comprising, in combination, a tool holder, means to support said tool holder for movement in a plane, means available to guide said tool holder through a predetermined path in said plane, and means to control said last mentioned means to modify said path to compensate for side clearance angle.

26. A mechanism of the character described comprising, in combination, a tool holder, means to constrain said tool holder for free universal movement in a plane, means having a guide member movable to define a predetermined projected contour in a plane inclined to said first mentioned plane, and to move said holder through a path coincident with a projection of said contour in said first mentioned plane foreshortened to compensate for end clearance angle, and means available to control said last mentioned means to modify the path of said holder.

27. A device of the character described comprising, in combination, a support, a slide freely reciprocable along a rectilinear path on said support, an annular member mounted on said support for rotary adjustment about an axis inclined at an acute angle to said path, a slide mounted for diametrical adjustment in said member, a sleeve mounted on said last mentioned slide for rotary adjustment about an axis parallel to said first mentioned axis, an elongated bar extending axially through said sleeve and being mounted for longitudinal adjustment therein, a rotary tool holder, means mounted on said support for constraining said holder for universal movement in a plane perpendicular to said path, and a universal rotary drive connection between one end of said bar and said tool holder and being adjustable transversely of the axis of said bar selectively into concentricity or into different degrees of eccentricity with said bar.

28. In a device of the character described for dressing an abrasive wheel, a support, a tool holder, means on said support for constraining said holder for universal movement in an axial plane of said wheel, and guide means for said holder comprising a slide mounted on said support for free floating adjustment in a plane parallel to the axis of said wheel and perpendicular to said first mentioned plane, a member mounted on said slide for adjustment about an axis perpendicular to said last mentioned plane, a head mounted on said member for rotary adjustment about an axis inclined to said last mentioned plane and having an eccentric part, and a drive connection between said holder and said part.

29. In a device of the character described for dressing an abrasive wheel, a support, a tool holder, means on said support for constraining said tool holder for universal movement in an axial plane of said wheel, and guide means for said holder comprising a carrier mounted on said support for free floating adjustment in a plane parallel to the axis of said wheel and perpendicular to said first mentioned plane, a shaft mounted on said carrier for rotary adjustment about an axis inclined to said planes and being splined for free floating axial movement, a head on one end of said shaft and having an eccentric part, a drive connection between said holder and said part, a head on the other end of said shaft and having an eccentric part, a slide, a drive connection between said last mentioned part and said slide, means for constraining said slide for universal movement in a plane fixed relative to said carrier, a member for supporting said last mentioned means for adjustment about an axis perpendicular to said shaft and parallel to said last mentioned plane, and a member mounted on said carrier for supporting said last mentioned member for adjustment about an axis perpendicular to said shaft and said last mentioned axis.

JOHN EDGAR.